Dec. 3, 1940.  P. P. HORNI  2,223,992
VEHICLE DETECTION DEVICE
Original Filed June 13, 1934   3 Sheets-Sheet 1
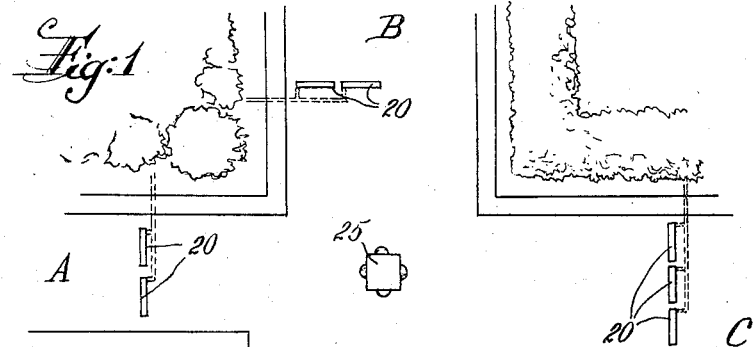
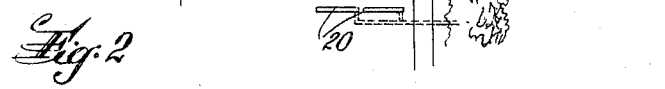
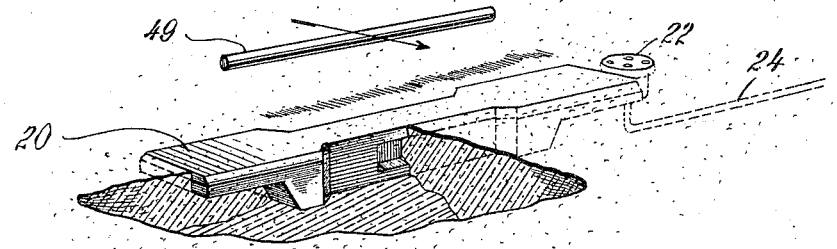
Paul P. Horni
INVENTOR
By Herbert J. Smith
ATTORNEYS Dec. 3, 1940.  P. P. HORNI  2,223,992
VEHICLE DETECTION DEVICE
Original Filed June 13, 1934    3 Sheets-Sheet 2
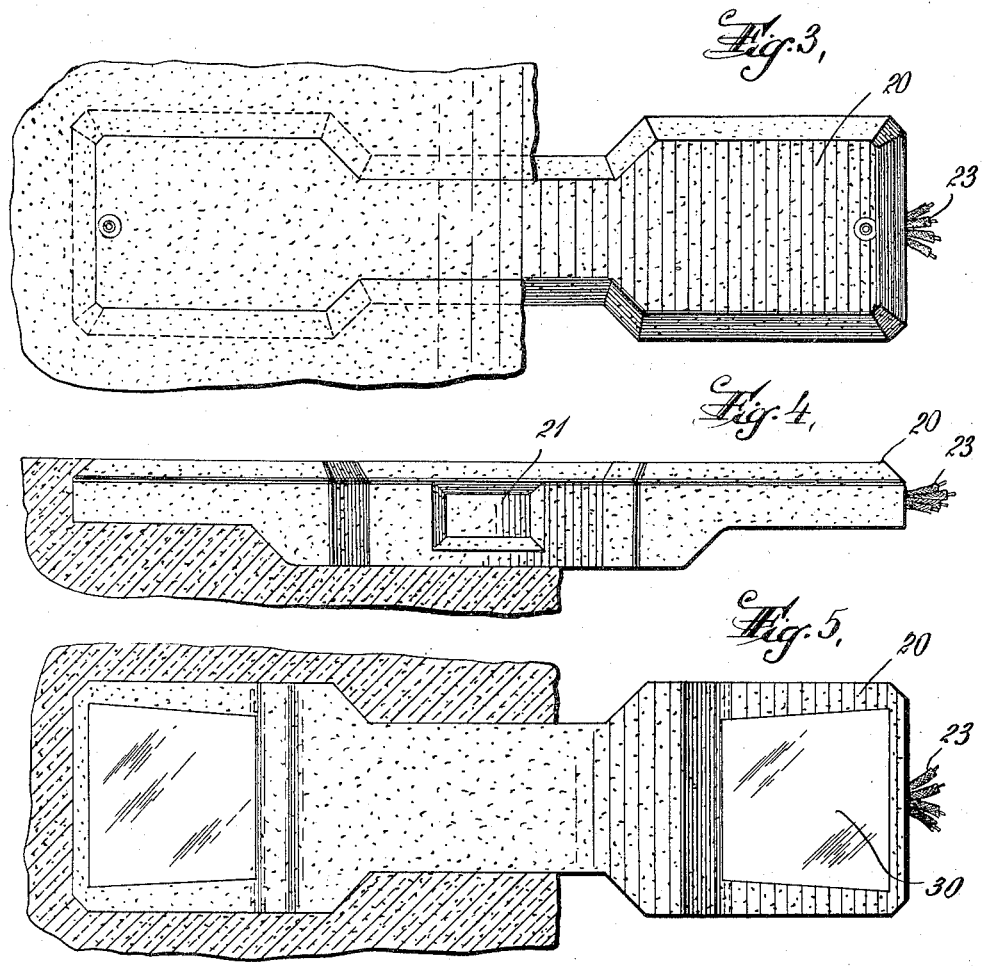
Paul P. Horni
INVENTOR
By Herbert H. Smith
ATTORNEYS

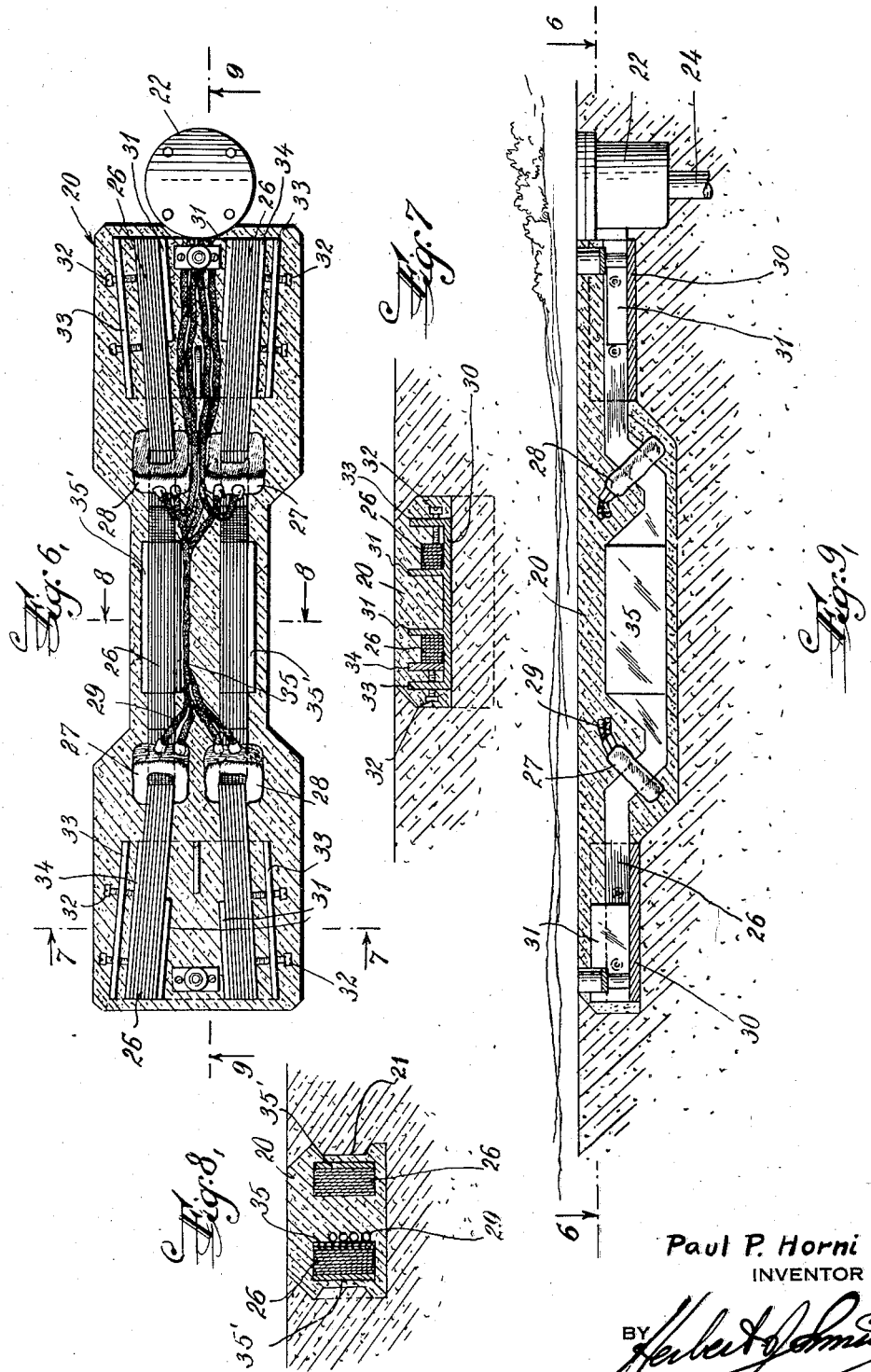

Patented Dec. 3, 1940

2,223,992

UNITED STATES PATENT OFFICE 2,223,992

VEHICLE DETECTION DEVICE

Paul P. Horni, Newark, N. J.

Original application June 13, 1934, Serial No. 730,388, now Patent No. 2,144,535, dated January 17, 1939. Divided and this application November 10, 1938, Serial No. 239,759

5 Claims. (Cl. 177—329)

This invention is a division of Patent No. 2,144,535, issued to Paul P. Horni, and pertains to detectors for electrically detecting the presence of bodies, and more particularly to magnetic vehicle detectors such as are used in the control of vehicular traffic, and the mechanical construction of a detector which is completely encased in a material or substance of a plastic or moldable nature.

Heretofore, in the art of signaling, devices have been used which are commonly called detectors. These detectors are used on highways for vehicular traffic such as automobiles, on railroads for detecting the presence of an engine or other unit of rolling stock, in driveways for detecting bicycles or other metallic units of traffic, and in other places where the presence of certain objects is desired to be detected.

Magnetic and inductive detection has been applied with some measure of success in the train control art, and that has been largely due to the fact that the larger metal masses of trains, including the locomotive and other parts of the rolling stock, are easily detected magnetically, but when it is desired to apply that principle to the detection of smaller bodies, or bodies containing a small amount of detectable material, or bodies at a distance from the detector, such as road vehicles, elevators, vessels, magnetic-flux-emanating bodies, ore or remote metal bodies and deposits, and the like, a greater degree of sensitivity is necessary for the detector in order that it will respond to the body or other subject, the presence of which is to be detected. However, this greater degree of sensitivity in the detector also has the objection that the detector is readily affected or disturbed by extraneous disturbances, having no connection with the body or subject to be detected, and by way of example, a detector mounted in a road bed, which is sufficiently sensitive to detect the presence of all sorts of rapidly moving traffic, is likely to be affected by the presence of metal near by, including water, gas, and sewer pipes, reenforcing metal in a concrete street, and the like, as well as disturbances due to surges in adjacent power lines, and the like, or the vibratory action of any of the above mentioned presumably normally stationary objects.

The detector referred to has a coil of wire, which coil is connected to an electrical circuit of some nature. The nature of the electrical circuit will depend primarily upon the object or unit of traffic to be detected. If the object to be detected possesses a small amount of magnetizable material, or if the distance between the detector and the unit of traffic is great, then it may be and usually is necessary to provide sensitive means in, for, or with, the circuit that is connected to the detector coils, so that the unit of traffic will be detected.

To more rapidly comprehend the present invention, it is pointed out that in operation the detector is placed in a given vicinity so that the unit of traffic will cause a controller to operate when said unit of traffic comes within the effective range of the detector.

Referring to the control of traffic, in this case, the unit of traffic may be any means which may operate the detector.

While it is not necessary to go into the controller circuit used for detectors to complete this case, a brief statement will be made herein to incorporate a general idea of the operation of the circuit in connection with the detector. The coils which are mounted on a core are connected to an electrically sensitive instrument, which instrument in turn causes the operation of the signal. The signal may be audible, such as a gong, or visible, such as a traffic light. Depending on the proximity of the unit of traffic to the detector, and the effective magnetic strength of the unit of traffic, the signal will or will not operate. If the unit of traffic is within the effective range of the detector, then the traffic signal or other means will be operated. Depending on the work to be accomplished, the sensitive instrument is selected for the particular installation. Under certain conditions, it may be necessary to use a highly sensitive instrument which may be of the galvanometer type, or a radio amplification unit may be employed to amplify the effect of the vehicle in regards the detector and its associated circuit.

The sensitive instrument which controls the signal is operated by the movement of a metallic body within the effective range of the detector. This movement of the metallic body with the detector is relative, that is while the detector is supposed to be held stationary, the metallic body is moved while in the presence of the detector. Theoretically, it is true, that the metallic body or unit of traffic is supposed to move, and that the detector is supposed to remain stationary. However, this is not always the case. If there is any relative cutting of the conductors of the detector coil by the magnetic flux, then the signal controllable by the detector is potentionally in the act of operation, even though the flux which relatively cuts the conductors of the detector coils may be insufficient to cause the traffic signal to be operated.

With the foregoing showing, it is pointed out that depending on the particular bodies used in conjunction with the detector, the relatively small cutting of flux may be sufficient and frequently is sufficient to operate the traffic signal. The reason that the word "relatively" has been used in relation to the cutting of the detector coils by flux is due to the fact that the coils themselves may move in relation to a magnetic body and thereby cause an actuation of the traffic signal. In the case one detector coil vibrates on its core and operates the traffic signal, the traffic signal would receive a false operation. That is, the traffic signal would be operated not by a unit of traffic desiring to operate a traffic signal, but rather by the vehicle detector due to the shifting or vibrating of the detector coil in the presence of magnetic flux which may emanate from its own core.

The purpose of this invention is to eliminate this false movement of the coils in relation to any ordinary stationary magnetic body, and also to prevent the coils from moving in relation to their own cores which may or may not be permanent magnets per se. While the core of the detector coil in the present case is not shown to be an electromagnet, it is to be understood that the detector coil core may definitely be a permanent magnet. This is particularly stressed because it is pointed out that practically, it is extremely difficult to obtain a magnetic core which does not possess magnetic polarity in some degree.

While the discussion so far has referred to relative movement of flux past a detector coil to cause signal operation, it is pointed out that if two or more coils are properly positioned, the movement of one coil in relation to another coil, under certain conditions may cause the relative cutting of conductors by flux which results in the operation of the traffic signal. That the signal may be operated by the relative cutting of a coil by flux, whether this flux be from a permanent magnet or from magnetic field produced by an electrical conductor having a current flowing therein, is immaterial. It is not contemplated that the unit of traffic necessarily be metallic since the unit may be of non-magnetic material having an electromagnet for the purpose of operating the detector.

An object of this invention is to provide a vehicle detector having one or more coils on a core, ridgedly secured in a monolithic block of plastic material.

A further object is to provide a vehicle detector having a core ridgedly secured in relation to a coil by a moldable material.

A further object is to provide a vehicle detector having a plurality of coils and cores therefor held in fixed relation to each other by a moldable material.

A further object is to provide a vehicle detector having a coil which may be placed on a core prior to being ridgedly secured thereto by a moldable material.

A further object is to provide a vehicle detector having a core with a coil thereon and shield therefor, and means to hold said core in fixed relation to said shield and for holding said coil in fixed relation to said core.

A further object is to provide a plurality of coils in a vehicle detector having means for fixedly holding said cores in relation to one another.

A further object is a provision of a monolithic block of moldable material having slots or indentures therein to be used as a locking means when the monolithic block is placed in position to have its surface engage other moldable material, for instance, cement for surface paving.

Further and other objects may be and may become apparent to those skilled in the art without departing from the spirit of the claims herein.

For a more complete understanding of the invention references may be had to the accompanying drawings in which, in order to clearly illustrate my invention I have shown an adaptation to traffic control.

Fig. 1 illustrates a street or road intersection with a typical street arrangement of the detector units of this invention.

Fig. 2 is a perspective view of one of the detector units mounted in a road bed.

Figs. 3, 4, and 5 are respective plan, side, and bottom views of one of the detector units.

Fig. 6 is a horizontal section through one of the detector units, as seen substantially along the line 6—6 of Fig. 9.

Figs. 7 and 8, are transverse sections through one of the detector units as seen along the lines 7—7 and 8—8, respectively, of Fig. 6.

Fig. 9 is a vertical section through one of the detector units as seen along the line 9—9 of Fig. 6.

Fig. 10 illustrates in perspective one of the transformers of a detector unit.

Referring to Fig. 1 of the drawings, showing the application of the new detecting system to traffic control, numeral 20, designates the detector unit which is laid lengthwise across the street or road at the detection point and in the manner indicated, i. e., in the path and transversely of the direction of movement of vehicular traffic approaching the intersection of the streets or roads, A, B, C, and D. Also, as many of the detector units of uniform size as are necessary may be laid lengthwise end-to-end in a line across a street or road of considerable width, as is indicated in streets B, C, and D, whereas in one-way streets, as in street A, the detector units extend across the street in a manner as shown, to control traffic flow thereon.

In external appearance the detector units 20, may be monolithic blocks of concrete or other moldable material without other housing or enclosing means, as is illustrated in Figs. 3, 4, and 5, and accordingly are settable flush in a concrete-surfaced road bed, or the like, without liability of subsequent settling or rising to impair the smooth surface of the road or street but, in fact, becoming bonded thereto so as to be part of it. The units are provided with key recesses 21, into which the concrete or the like of the road surfacing material is introduced when it is laid, so that the unit 20, are securely locked in place without requiring other anchoring means. A connection box 22 (Figs. 2, 6, and 9) for housing the wires 23, completes the detector unit assembly during placement in the road bed, the wires 23, leading through a conduit 24, to the control box, or the like, for the traffic signal 25, located in the center of the intersection, or the like.

The detector unit 20, includes a transformer element comprising two separated but inductively coupled transformers, each having an elongated, laminated, open core 26, of magnetically permeable material, such as iron or steel, their alloys, or the like, which is shaped with upturned ends to shorten the upper air gap, as is illustrated in perspective in Fig. 10, and in elevation in Fig. 9. The cores 26, are arranged substantially parallel and each of them carries a primary winding or coil 27, and a secondary winding or coil 28, arranged in such a way that the primary and secondary coils of the two cores 26, are located adjacent each other, as is illustrated particularly in Figs. 6 and 9. Leads 29, for these primary and secondary windings extend into the connection box 22.

The primary and secondary windings 27 and 28, and their leads 29, are encased in a non-capillary active envelope built up in a novel manner on enameled wire with insulating material including an initial silk braid or fabric covering, a secondary linen or cotton braid or fabric, and a final dense rubber coating, each of the porous fabric layers being saturated with nitrocellulose lacquer before the next layer is applied and the final rubber coating immersed in the lacquer. The rubber coating is used to prevent mechanical injury to the nitrocellulose and the several layers of lacquer effectively close the pores of the silk, linen, and rubber layers, so that not only are the coils and their leads effectively protected and insulated, but all pores thereof are closed so as to prevent infiltration of moisture by capillary action or condensation by rapid change of temperature. Long and exhaustive tests have proven this coating to be absolutely moisture proof under all operating conditions, whereby uniform operation of the more vulnerable part of the detecting system is assured and replacements and repairs are thus eliminated.

The flow of the leakage flux is confined or restricted in a predetermined direction, such as upwardly, by shielding the ends of the transformer cores 26, as is illustrated in Figs. 6 and 7. This shielding means comprises conductive material such as aluminum, copper, brass, or the like, arranged at the ends of the transformer cores 26, in the form of a plate 30, having upstanding ribs 31 and 33, which embrace the inner and outer surfaces of the transformer cores 26, near their ends. Set screws 32, are threaded through upstanding outer ribs 33, and the transformer cores 26, are thus clamped against the ribs 31, as indicated particularly in Fig. 7. Interposed between set screw 32, and the primary end of each of the transformer cores 26, is an auxiliary shielding plate 34. The shielding 30, 31, 33, and 34, prevents the lateral and downward flow of the leakage flux from the corresponding ends of the transformer cores 26, and thus confines the flow of the flux in a substantially upward direction. The shielding 30, 31, 33, and 34 is made sufficiently thick to effectively shield the transformer cores in the manner described. The conductive metals noted act as shields in the manner well known in the electrical art. Thus when alternating magnetic flux from the transformer cores encounters the conductive shield metal, this flux sets up eddy currents in the metal of the shields and these eddy currents in turn induce a magnetic flux which opposes the passage of the flux from the transformer cores. In order to shield the center of the transformer core 28, which lies next adjacent the leads 29, a shield 35, is interposed between these leads and the center portions of the adjacent core 26, as is illustrated in Figs. 6, 8, and 9. This shield 35, is made up of a layer of non-conductive, non-magnetic material adjacent the core 26, of the transformer and a thin layer of conductive material adjacent the leads 29, to prevent the magnetic flux of the leads 29, from unbalancing or otherwise disturbing the magnetic flux within the core 26.

The entire organization of the detector unit just described is assembled in a mold or form at some point remote from the place of use, the shield plate 30, with its upstanding ribs 31 and 33, and set screws 32, serving to hold the transformer cores 26, properly spaced with their primary and secondary windings 27 and 28, in the proper relationship. In this condition the initially plastic material, preferably concrete, is poured in the mold or form around the electrical elements of the detector unit, so that the monolithic structure 20, previously described, is formed, which consists in effect of a transformer encased in a monolithic block without requiring the use of additional containers or housings containing liquid or plastic insulation as is usual with transformers.

Referring to Figs. 3, 4, and 5, the key recesses 21, and the inclined edge of the detector where it joins the road surface are more clearly shown. In Fig. 8, we see the recess 21, and the inclined surface above which act as locking means to securely hold the monolithic block, or detector housing 20, in fixed relation with the pavement. In Fig. 5, it shows the shielding means being exposed, but it is to be understood that this is one means of construction, and the shielding 30, may also be enclosed within the confines of the moldable material as is the case with the shield 35', which is located substantially in the center of the detector. The shielding means may be contiguous with or spaced from the core depending on the particular results desired. It is not necessary that the shielding means be shown in the shape herein, but may be of any suitable material disposed in any suitable location provided it accomplishes its proper result, and ordinary function. This shield may be in any shape whatsoever, and may be a magnet or magnetizable material such as a plate, bar, wire, composition, or other material.

While the coils such as 27 and 28, have been characterized in one example, it is to be understood that these coils may be made in any other form or manner which gives the desired results. This invention is not limited to the particular construction of a given coil, but rather to a combination of the coil or coils with the core and conductors in a moisture-resisting or waterproof housing. Further it is to be understood that the shape of the detector is not necessarily limited to the general shape as presented herewith since the detector shown in the present drawing is only one type of detector which may be employed. Fig. 10, shows generally the core having a plurality of coils 27 and 28, thereon. The coils are slipped over the ends of the core to the desired or predetermined position. The shape of the core may be any suitable shape such as square or round, and the core may be a simple bar such as 49, which is shown in Fig. 2.

The bar 49, in Fig. 2, has an arrow indicating the general direction of movement of the bar, which shape represents a unit of traffic, and has been expressed as an axle or bar for the purpose of simplicity.

It is further pointed out that while the core and coil are located in a monolithic block, it is also to be understood that where expediency dictates, a simple bar with a simple coil may be set in a housing of any suitable material so long as it provides the desired functions of holding the coils in fixed relation to the core for use as a vehicle detector.

While the detector presented herewith has been shown as being molded into the pavement of the highway, it is to be understood that the detector may be inserted below the pavement in a suitable manner, or may be used in conjunction with a tarred highway or even an ordinary dirt road.

While the invention has been illustrated as applied to typical traffic installations, it is to be understood that it may be used in practically every conceivable signal system or devices of various kinds for signaling, and that various refinements and improvements of this invention are not necessarily limited to traffic control as regards automobiles, but are applicable in other fields within the scope of this invention. For example, the new detector can be employed for detecting and signaling the passage of vessels, signaling the registration of vessels at docks or piers, or of air craft when landing, location of ore bodies and buried magnetic and inductive masses, and for any other purpose where magnetic or inductive detection can be employed.

Having thus described the invention, what I claim is new and desire to secure by Letters Patent of the United States, is:

1. A magnetic detector for detecting the presence of units of traffic having in combination a detector coil for connection to a circuit to operate a traffic controller by the presence of a unit of traffic in close proximity to said coil, a bar of magnetizable material having one portion thereof in relatively close proximity to said coil, a ceramic moldable material for holding said coil and said magnetizable material in fixed relation to each other, the external area of said ceramic material constituting the surface of the housing for said coil and said moldable material.

2. A magnetic detector for insertion in a highway for detecting the presence of units of traffic, having in combination a coil of wire for connection to a control circuit to operate a traffic controller by the presence of a unit of traffic in substantially close proximity to said coil, a bar of magnetizable material having one portion thereof in relatively close proximity to said coil, a cementitious material molded around said coil and said magnetizable material holding them in approximately a fixed relation one to the other, said cementitious material having the exterior surface thereof formed with means to interlock with the moldable surface of a highway to become substantially a part thereof and to prevent the detector unit from substantial lateral or longitudinal movement in regards the highway.

3. A magnetic detector unit for detecting the presence of vehicles and for inserting the detector in a highway having the upper surface of said detector unit substantially flush with the surface of the highway and being a part thereof, a bar of magnetizable material forming a core, a plurality of coils on said core, a ceramic material molded about said core and said coils to hold same permanently in a fixed relation to one another, said moldable material having one exterior surface thereof substantially flat, and certain of the other exterior surfaces of said moldable material having recesses therein to interlock with the moldable material of the highway.

4. A vehicle detector of the magnetic type for detecting the presence of vehicles in a highway, comprising a core and a plurality of coils for said core, a moisture resistant moldable ceramic material being molded around said core and said coils to hold said coils in a permanently fixed relation one to the other, the ceramic material having certain of the outer surfaces thereof formed to interlock with the moldable material of a highway, one surface of said detector having a flat surface so that when the detector is placed in the street the flat surface will constitute part of the traveled surface of the highway.

5. A magnetic detector for detecting the presence of vehicles in a highway having a coil and a core, a substantially homogeneous mass of moisture resistant material molded about said coil and said core and one surface thereof to be used as the surface of a traveled highway and certain of the other surfaces to be formed for interlocking said detector with the material of the highway to prevent substantial movement of the detector in the highway.

PAUL P. HORNI.